United States Patent [19]

Inoue

[11] Patent Number: 5,136,665
[45] Date of Patent: Aug. 4, 1992

[54] TWO-SIDED ORIGINAL READING APPARATUS

[75] Inventor: Keishi Inoue, Yokohama, Japan

[73] Assignee: Canon Kabushiki Kaisha, Tokyo, Japan

[21] Appl. No.: 790,030

[22] Filed: Nov. 6, 1991

Related U.S. Application Data

[63] Continuation of Ser. No. 302,909, Jan. 30, 1989, abandoned.

[30] Foreign Application Priority Data

Feb. 2, 1988 [JP] Japan .................................. 63-022458

[51] Int. Cl.⁵ .............................................. G06K 9/00
[52] U.S. Cl. ..................................... 382/62; 355/23; 358/408; 358/496; 382/65
[58] Field of Search ................ 382/62, 65, 7; 358/408, 358/496, 498, 474, 486, 296; 355/23, 24, 25

[56] References Cited

U.S. PATENT DOCUMENTS

| | | | |
|---|---|---|---|
| 3,949,363 | 4/1976 | Holm | 382/62 |
| 4,475,128 | 10/1984 | Koumura | 358/296 |
| 4,563,771 | 1/1986 | Gorgone et al. | 382/65 |
| 4,571,636 | 2/1986 | Itoh | 355/23 |
| 4,577,344 | 3/1986 | Warren et al. | 382/65 |
| 4,734,742 | 3/1988 | Klumpp et al. | 355/23 |
| 4,743,974 | 5/1988 | Lockwood | 355/23 |

FOREIGN PATENT DOCUMENTS

58-111480 2/1983 Japan .................................. 358/408
58-111481 2/1983 Japan .................................. 358/408

*Primary Examiner*—Joseph Mancuso
*Attorney, Agent, or Firm*—Fitzpatrick, Cella, Harper & Scinto

[57] ABSTRACT

A two-sided original reading apparatus includes carrying means for carrying an original in a predetermined carrying direction. First reading circuitry reads the image on the first face of the original at a first reading position and generates first analog image signals. Second reading circuitry reads the image from the second face of the original at a second reading position different from the first reading position with respect to the carrying direction, and generates second analog image signals. Converting circuitry converts the first and second analog signals into first and second digital signals, respectively. Delay circuitry is provided for delaying one of the first and second digital image signals with respect to the other by a delay time which corresponds to a deviation between the first and second reading positions.

13 Claims, 6 Drawing Sheets

TWO-SIDED ORIGINAL READING APPARATUS

This application is a continuation of application Ser. No. 07/302,909 field Jan. 30, 1989, now abandoned.

BACKGROUND OF THE INVENTION

1. Field of the Invention

The present invention relates to an original reading apparatus for reading an original which is filed in; for instance, an image information filing apparatus or the like.

2. Related Background Art

There have been proposed various kinds of image information filing apparatuses in which an image signal is stored into a file medium such as a magnetic disk, optical disk, or the like, and image information is retrieved and read out of the file medium as necessary and printed, displayed, or the like. As an apparatus for inputting an image signal to such a filing apparatus, an image reading apparatus for photoelectrically reading an original image by using a CCD image sensor or the like is used.

However, to read an original having images to be filed on both sides, the original is turned upside down by an automatic turning mechanism or by a manual operation and image information is read out from each side. Therefore, the operations are complicated and the image information of both sides of an original cannot be simultaneously read at a high speed. Thus, when a large number of two-sided originals are read, it takes a long time and a situation such that the reading of the original is forgotten easily occurs.

On the other hand, since the images of the front face and rear face of the same original are respectively independently managed as different images, in the case of retrieving the information filed on the file medium, there is a problem such that both of the front and rear faces of one original cannot be simultaneously easily output unless software processes are executed.

SUMMARY OF THE INVENTION

The present invention is made in consideration of the foregoing points and it is an object of the invention to provide an original reading apparatus which can preferably read images of both front and rear faces of an original at a high speed.

Another object of the invention is to provide an original reading apparatus which can efficiently process the read signals of images of the front and rear faces of an original.

Still another object of the invention is to provide an original reading apparatus in which the read signals of images of the front and rear faces of an original are output as a pair in a manageable format.

Yet another object of the invention is to provide an original reading apparatus comprising: conveying means for conveying an original; a plurality of reading means for reading at different positions the images of the front and rear faces of the original conveyed by the conveying means; and correcting means for correcting an aberration of the reading positions of the plurality of reading means for the image signals which are respectively output from the plurality of reading means.

The above and other objects and features of the present invention will become apparent from the following detailed description and the appended claims with reference to the accompanying drawings.

DETAILED DESCRIPTION OF THE PREFERRED EMBODIMENT

A preferred embodiment of the present invention will be described hereinbelow.

Figure 1:
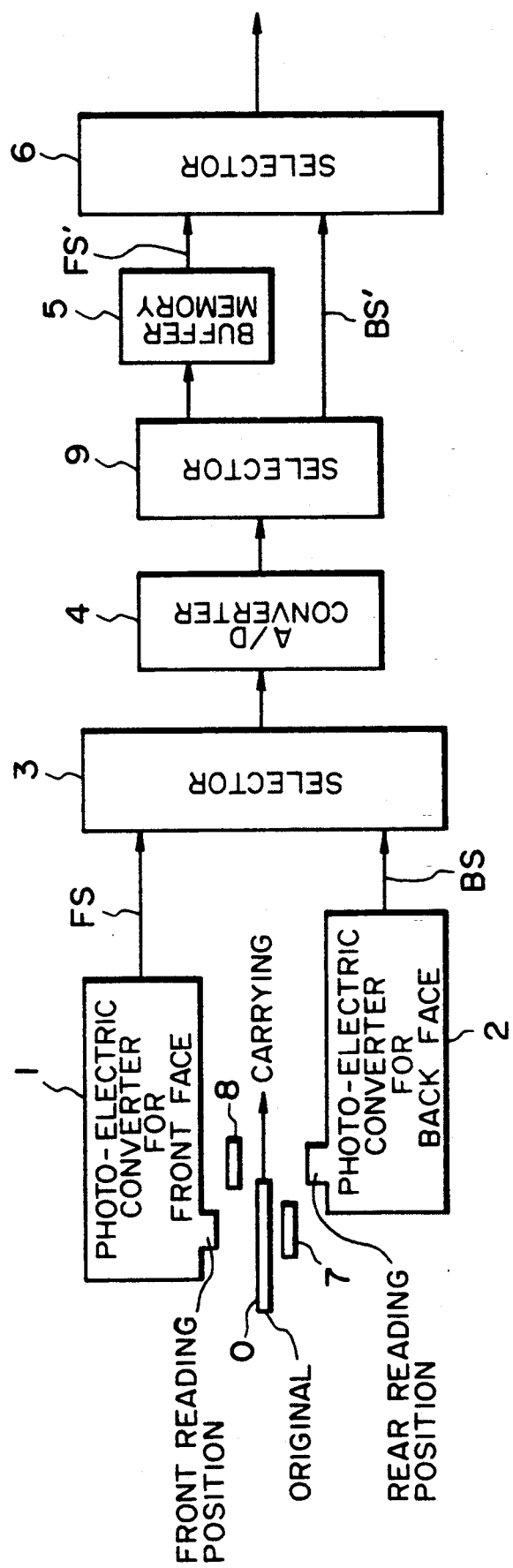
FIG. 1 is a block diagram showing an example of a construction of an image reading apparatus to which the present invention is applied.

FIG. 1 is a block diagram showing an example of a construction of an image reading apparatus to which the invention is applied. Reference numeral 0 denotes an original (called a two-sided original) which has images on both sides and is carried in the direction indicated by an arrow; 1 and 2 represent photo-electric converters each of which has a line image sensor comprising a plurality of photosensitive elements arranged in the direction perpendicular to the carrying direction of the original 0 and which photo-electrically read the images of the front and rear faces of the two-sided original, respectively; 3 is a selector to select on a line basis image signals which are output from the photo-electric converters 1 and 2; 4 is an A/D converter to convert an analog image signal which is output from the selector 3 into a digital image signal of a predetermined bits every pixel; 9 is a selector to separate the digital image signals indicative of the front and rear face images from the digital image signal which is output from the A/D converter 4; 5 is a buffer memory to delay the digital image signal indicative of the front face image separated by the selector 9 by a predetermined time; and 6 is a selector for selecting one of the digital signal of the front face image from the buffer memory 5 and the digital image signal of the rear face image from the selector 9 and for outputting the image signal.

In this manner, the photo-electric converters 1 and 2 are separately provided to read the front side image and rear side image of the original. The front face and rear face original reading positions are arranged so as to be deviated with respect to the carrying direction of the original. The backgrounds at the reading positions are constructed by black opaque plates 7 and 8. Further, the selector 3, A/D converter 4, buffer memory 5, and selectors 6 and 9 are provided as a circuit system to correct a time deviation between the image signals due to the positional deviation between the front and rear reading positions of the original.

By the above construction, both faces of the original can be simultaneously read at a high speed without performing the troublesome manual operations. Further, by deviating the front and rear reading positions, even when a thin original is read, it is possible to eliminate an inconvenience such that the image on the rear side of the face to be read is erroneously read. Moreover, since the background at the reading position is black, a frame of an original can be easily recognized.

Figure 2:
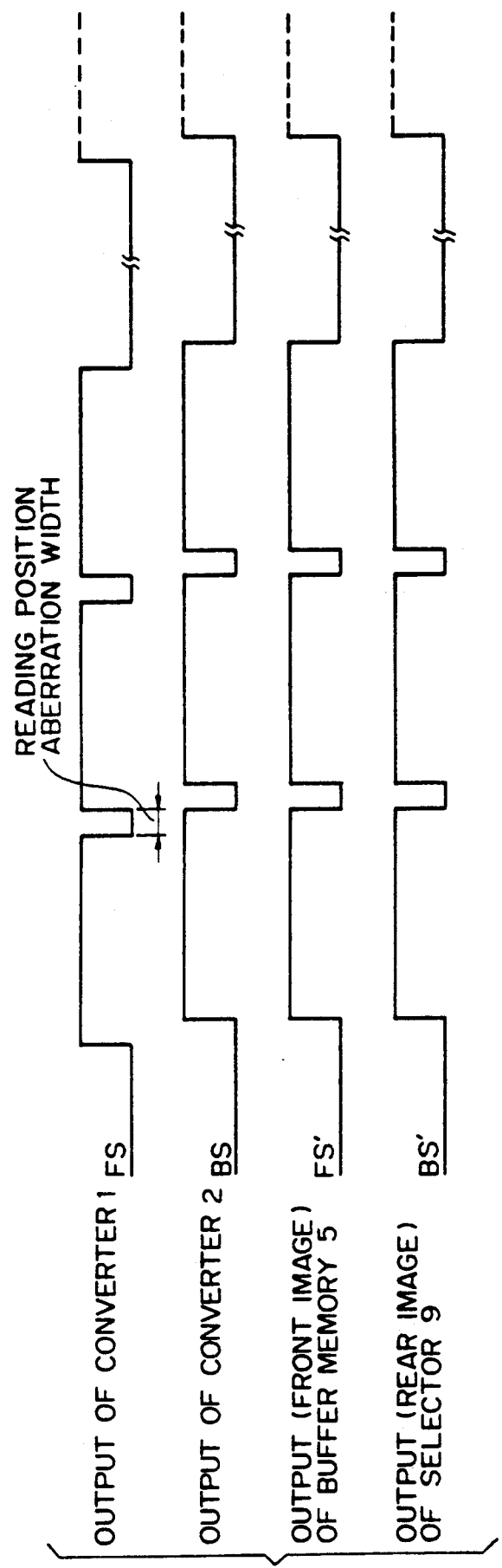
FIG. 2 is a timing chart showing an output state of an image signal in the construction of FIG. 1.

FIG. 2 is a timing chart showing output states of image signals in the case where a plurality of originals are continuously read in FIG. 1. Even in the case of continuously reading a large number of originals as shown in the timing chart of the signals of FIG. 2, the image signals respectively indicative of the front and rear face images of the same original can be simultaneously output.

Figure 3:
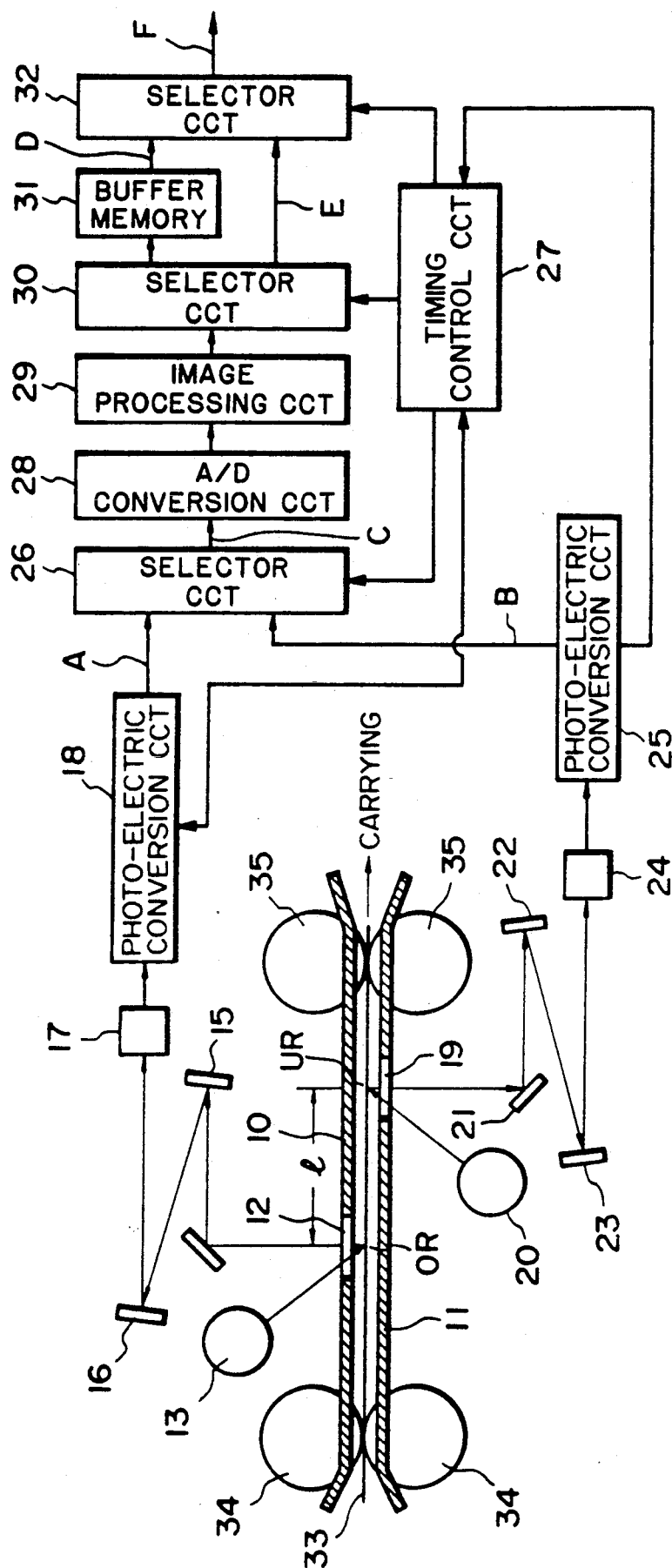
FIG. 3 is a block diagram showing an example of a further detailed construction of the image reading apparatus.
Figure 4:
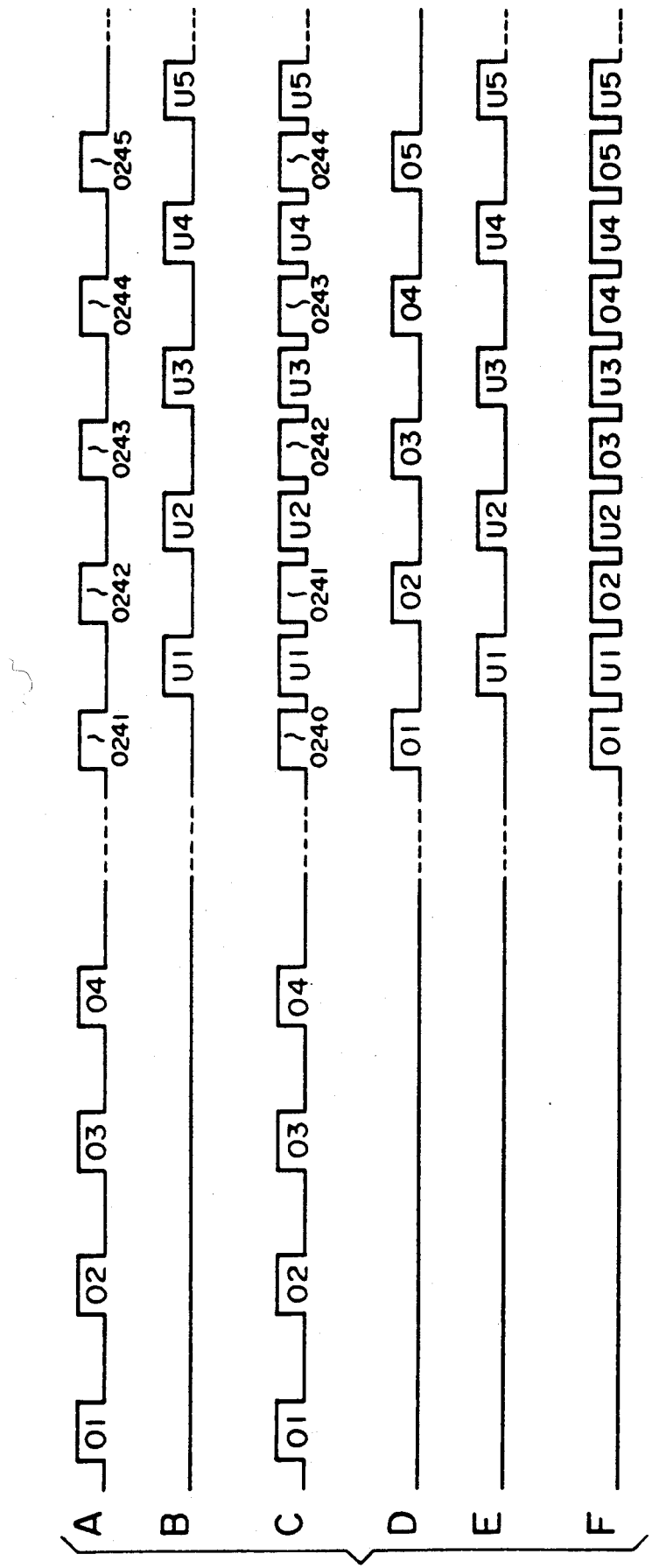
FIG. 4 is a timing chart showing an output state of an image signal in each section.

FIG. 3 is a block constitutional diagram showing an example of a further detailed constitution of the image reading apparatus shown in FIG. 1. FIG. 4 shows an output state of the image signal in each section in the construction shown in FIG. 3. In FIG. 4, 0 and U respectively indicate image signals of the front and rear faces and each numerical value represents the line number.

In FIG. 3, reference numeral 33 denotes a two-sided original; 34 and 35 indicate two pairs of conveying rollers to convey the original 33 at a constant velocity; 10 and 11 are black opaque original guides arranged over and below the conveying path of the original 33; and 18 and 25 are photo-electric conversion circuits each comprising a line image sensor which scans the image in the direction perpendicular to the carrying direction of the original 33 and has a plurality of photo sensitive elements. Reference numeral 27 denotes a timing control circuit to control the operation timing in each section in FIG. 3. The timing control circuit 27 is constructed by, for instance, a reference oscillator, a counter, and the like.

Reference numeral 12 denotes a front face reading window as a transparent portion which is opened on the original guide 10 on the upper side of the conveying path, and 13 indicates a light source to read the front face. An optical system comprising reflective mirrors 14, 15, and 16 and a lens 17 leads the reflected light from the image of the front face of the original 33 exposed by the light source 13 to the photo-electric conversion circuit 18 to read the front face.

Reference numeral 19 denotes a rear face reading window as a transparent portion which is opened in the original guide 11 on the lower side of the conveying path, and 20 represents a light source to read the rear face. An optical system comprising reflective mirrors 21, 22, and 23 and a lens 24 leads the reflected light from the image of the rear face of the original 33 exposed by the light source 20 to a photo-electric conversion circuit 25 to read the rear face.

In FIG. 3, the original 33 is carried at a predetermined velocity in the direction indicated by an arrow in the diagram between the original guides 10 and 11 made of black opaque members by using the conveying rollers 34 and 35. When the original 33 is carried to the front reading window 12 which is opened in the upper original guide 10, the front face of the original is illuminated by the light source 13 while the original is passing that position. The reflected light is transmitted through the mirrors 14, 15, and 16 and lens 17 and is led to the front photo-electric conversion circuit 18. The image information of the front face of the original 33 is read every line and converted into the electric signal and output every line as shown by A in FIG. 4.

When the original 33 is further conveyed and reaches the rear reading window 19 which is opened in the lower original guide 11, the rear face of the original 33 is illuminated by the light source 20 while the original is passing that position. The reflected light is transmitted through the mirrors 21, 22, and 23 and lens 24 and is led to the rear photo-electric conversion circuit 25. The image information of the rear face of the original 33 is read every line and converted into the electric signal and output every line as shown by B in FIG. 4. The photo-electric conversion circuits 18 and 25 are timing controlled by the timing control circuit 27 so as to alternately output the image signal. Thus, as will be explained hereinlater, the A/D converter and image processing circuit to form the digital image signal can be commonly time sharingly used for the front and rear face images.

A reading position UR by the rear photoelectric conversion circuit 25 in the rear reading window 19 is deviated in the carrying direction by only a distance ( from a reading position OR by the front photo-electric conversion circuit 18 in the front reading window 12. Therefore, in each of the reading positions, the background of the original 33 can be set to be black and opaque and is not influenced by the light source to read the other face. Consequently, even in the case of the thin original 33, for instance, a situation such that the image of the rear face is reflected to the front face due to the illumination of the light source from the rear side and is read does not occur. In the embodiment, the distance ( is set to 3 cm and a reading line density is set to 8 lines/mm, so that the deviation between the reading positions of the photo-electric conversion circuits 18 and 25 is set to a distance corresponding to 240 lines on the original. Therefore, as shown by A and B in FIG. 4, when the photo-electric conversion circuit 25 outputs the image signal ($U_1$) of the first line, the photo-electric conversion circuit 18 outputs the image signal ($O_{240}$) of the 240th line.

The photo-electric conversion circuits 18 and 25 provided on both of the front and rear face sides of the original running path respectively convert the front and rear images of the original 33 into the analog electric signals corresponding to the image densities every line and output to a selector circuit 26.

In the selector circuit 26, the front and rear image signals of the original 33 which are supplied from the front and rear photo-electric conversion circuits 18 and 25 are alternately selected every line in accordance with a timing signal which is generated from the timing control circuit 27. Thus, the front image signals $O_1$, $O_2$, . . . and the rear image signals $U_1$, $U_2$, . . . are synthesized as shown by C in FIG. 4 and output to an A/D conversion circuit 28.

In the A/D conversion circuit 28, the front and rear image signals which were switched every line by the selector circuit 26 are converted into the digital signals and output to an image processing circuit 29. The digital image signal is subjected to image processes such as shading correction and the like by the image processing circuit 29. The resultant image processed signal is output to a selector circuit 30.

The selector circuit 30 separates the front and rear image signals of the original 33 every line in response to a timing signal which is generated from the timing control circuit 27. When the front image signal is input, the selector circuit 30 outputs the separated image signal to a delay buffer memory 31. When the rear image signal is input, the selector circuit 30 outputs the separated image signal to a selector circuit 32.

When the front image signals $O_1$, $O_2$, . . . of the original 33 are input, the delay buffer memory 31 stores them for a predetermined time and delays them and outputs to the selector circuit 32 as shown by D in FIG. 4. The time to delay the signals is set to the time which is required to correct the time difference which is caused since the front reading window 12 is formed at the position before the position of the rear reading window 19 by only the distance l in the original carrying direction. Therefore, in the embodiment, since there is a deviation of the distance corresponding to 240 lines between the front and rear reading positions, the signals are delayed by the time corresponding to 240 lines.

In the selector circuit 32, the front digital image signal (D in FIG. 4) of the original 33 in which the difference of the reading position was corrected by the delay buffer memory 31 and the timing coincides with the rear digital image signal (E in FIG. 4) is synthesized to the rear digital image signal. The synthesized image signal is output as shown by F in FIG. 4. A timing signal at this time is also generated from the timing control circuit 27.

By the foregoing series of operations, the images of both of the front and rear faces of an original are simultaneously read at a high speed and a set of front and rear image signals whose timings are coincident can be obtained.

In the embodiment, a set of front and rear face image signals of one original have been obtained as an output. However, only one of either the front or rear image signals D and E which are input by the selector circuit 32 can be also output.

On the other hand, by changing the delay time of the buffer memory 31, after all of the image signals of the whole face of one of the front and rear faces (for instance, rear face) were completely output, the image signal of the other face (e.g., front face) can be also subsequently output.

On the other hand, the A/D conversion circuit and the image processing circuit can be also obviously provided for each of the front and rear image signals.

In the embodiment, although the positional deviation existing between the output D of the buffer memory 31 and the output E of the selector circuit 30, a delay amount of the buffer memory 31, can be also set so as to match the phases.

As will be obvious from the above description, the image of both faces of an original can be simultaneously read and the reading positions of the front and rear images are deviated and arranged, so that the image of the rear face is not read even when reading the front face of a thin original. On the other hand, the front and rear image signals of an original whose timings are coincident can be obtained.

In the embodiment, the front face of an original has been read at a timing which precedes the rear face. However, on the contrary, it is also possible to construct the embodiment in a manner such that the rear face of an original is read before the front face and the rear image signal is delayed by a time corresponding to the reading position deviation.

An explanation will now be given with respect to an example of a construction in the case where an image signal as shown by F in FIG. 4 which is output from the selector circuit 32 is stored in a file medium such as a magneto-optic disk (OMD) or the like.

Figure 5:
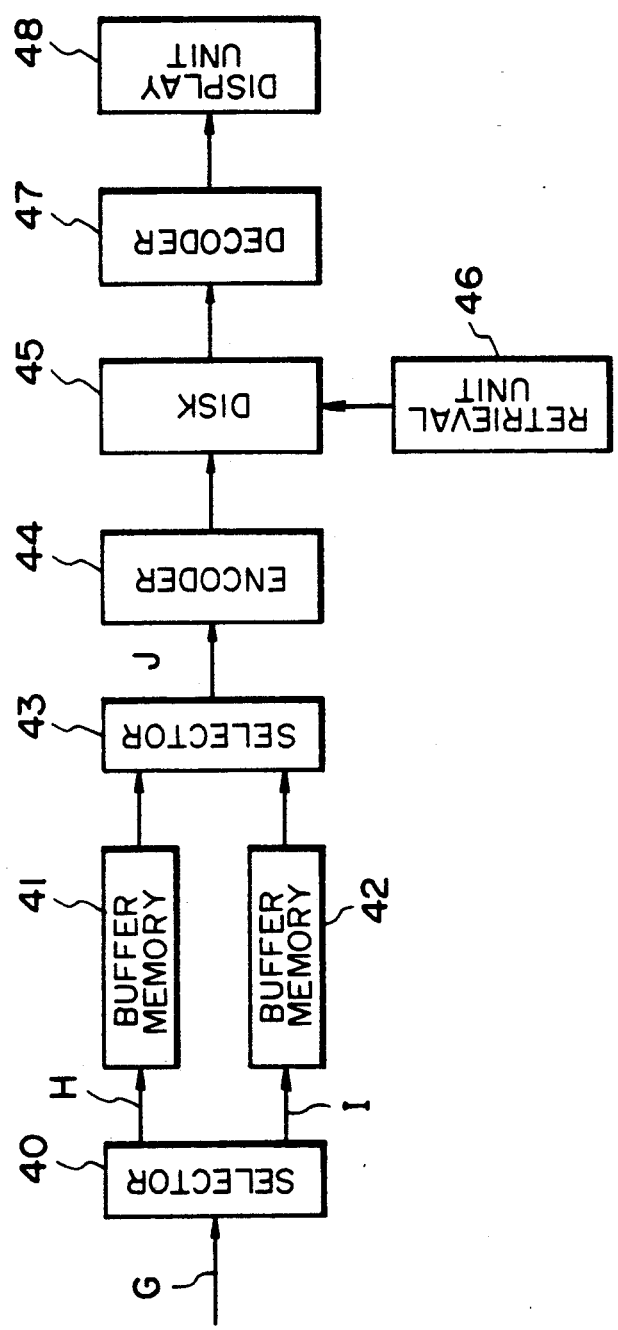
FIG. 5 is a block diagram showing an example of a construction of a filing system.
Figure 6:
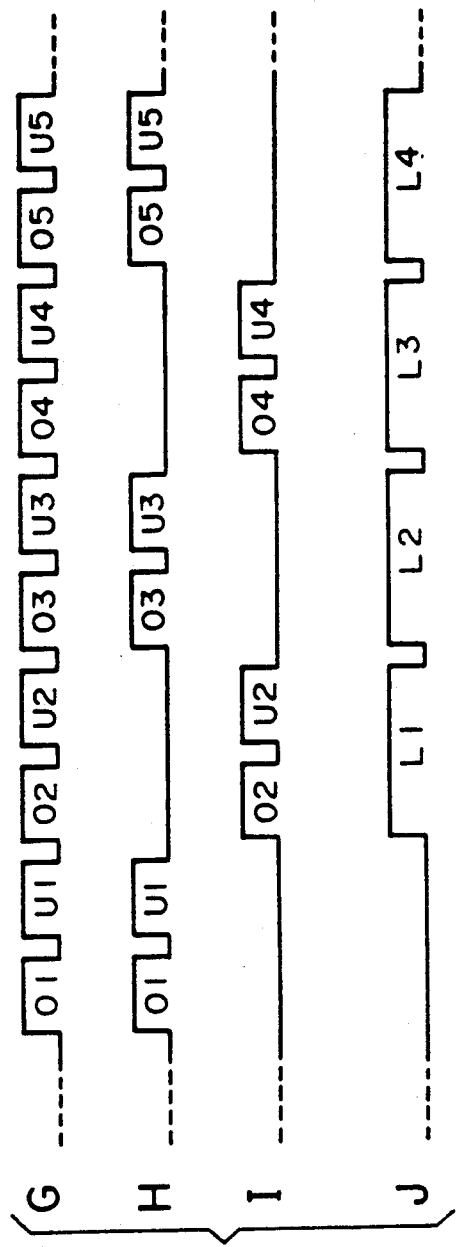
FIG. 6 is a timing chart showing output states of image signals in the construction of FIG. 5.

FIG. 5 is a block diagram showing an example of a construction of a filing system in which an image signal is compressed and stored on a disk, and the image retrieved and read out from the disk is displayed. FIG. 6 shows an output state of the image signal in each section in the construction shown in FIG. 5.

An output image signal G from the selector circuit 32 shown in FIG. 3 is input to a selector 40. Reference numerals 41 and 42 denote buffer memories into which the image signals of two lines can be stored, respectively. The selector 40 alternately outputs the input image signal G as a set of front and rear image signals of the same line to the buffer memories 41 and 42 (H and I in FIG. 6).

A selector 43 alternately selects the buffer memories 41 and 42 and outputs the front and rear image signals of the same line written in each of the buffer memories to an encoder 44 as an image signal (J in FIG. 6) of one line.

The encoder 44 compresses and encodes the image signal which was input from the selector 43 by using, for instance, a well-known encoding method such as MH, MR, MMR, or the like and stores the image information on a disk 45 having a memory capacity as large as the number of picture planes comprising an OMD or the like.

In the filing system of FIG. 5, as mentioned above, the images of the same line of the front and rear faces of the same original which were read are handled as an image signal of one line. That is, the front and rear images of the same original are handled as if they are one image. A common index for retrieval is given to these images and they are filed.

Reference numeral 46 denotes a retrieval unit to retrieve a desired image from the images of a plurality of picture planes stored on the disk 45 in accordance with a retrieval instruction. The compressed image signal which was retrieved by the retrieval unit 46 and read out from the disk 45 is expanded by a decoder 47 and supplied to a display unit 48 comprising a CRT, LC, or the like.

Figure 7:
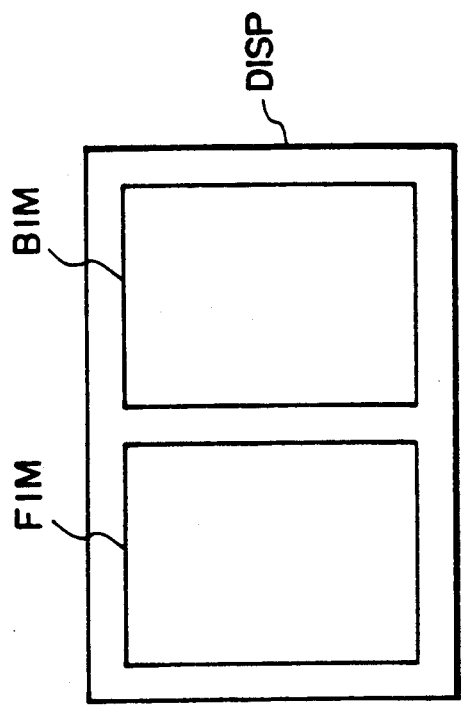
FIG. 7 is a diagram showing an example of a display of an image.

FIG. 7 shows an example of an image display on the display unit 48. In FIG. 7, DISP denotes a display screen of the display unit 48 and FIM and BIM represent a front face image and a rear face image, respectively.

As mentioned above, in the filing system shown in FIG. 5, since the front and rear images of the same original are filed as if they are one image, when the compressed image signal read out of the disk 45 is expanded and displayed, both of the front and rear images are displayed on the same display screen as shown in FIG. 7.

Therefore, the front and rear images of the same original can be always handled as a pair. The processes for filing, displaying, and the like of the front and rear images of the same original can be easily executed without needing a complicated program processes.

Although the preferred embodiments have been described above, the present invention is not limited to the foregoing embodiments but many modifications and variations are possible within the spirit and scope of the appended claims.

What is claimed is:

1. An original reading apparatus comprising:
carrying means for carrying an original in a predetermined carrying direction;
first reading means for reading, line-by-line, an image of a first face of an original carried by said carrying means at a first position, and for generating, line-by-line, a first analog image signal;

second reading means for reading, line-by-line, an image of a second face of the original carried by said carrying means at a second position which is different from the first position with respect to the carrying direction, and for generating, line-by-line, a second analog image signal;

converting means for converting the first and second analog signals generated by said first and second reading means into first and second digital image signals, respectively, and for generating, line-by-line, the first and second digital image signals;

delay means for delaying the first digital image signal with respect to the second digital image signal by a delay time corresponding to a deviation between the first and second positions, said delay means including a memory capable of storing a number of lines of the first digital image signal which correspond to the deviation between the first and second positions; and synthesizing means for alternately selecting the first digital image signal delayed by said delay means and the second digital image signal to generate, line-by-line, a synthesized digital image signal which is obtained by synthesizing the first digital image signal and the second digital image signal on the same line.

2. An apparatus according to claim 1, wherein said first reading means reads the image of the original prior to the reading performed by said second reading means.

3. An apparatus according to claim 1, wherein a background at each of the first and second positions is black.

4. An apparatus according to claim 1, further comprising first and second exposing means for respectively exposing the first and second faces of the original.

5. An apparatus according to claim 1, further comprising selecting means for alternately selecting the first and second analog image signals and generating a synthesized analog image signal, and wherein said converting means converts the synthesized analog image signal into a synthesized image signal.

6. An apparatus according to claim 1, wherein said second reading means initiates reading of the image of the second face of the original before termination of reading of the image of the first face of the same original by said first reading means.

7. An original reading apparatus comprising:

carrying means for carrying an original in a predetermined carrying direction;

first reading means for reading, line-by-line, an image of a first face of an original carried by said carrying means at a first position, and for generating, line-by-line, a first analog image signal;

second reading means for reading, line-by-line, an image of a second face of the original being carried by said carrying means at a second position which is different from the first position with respect to the carrying direction, and for generating, line-by-line, a second analog image signal;

selecting means for alternately selecting the first and second analog image signals generated by said first and second reading means and generating, line-by-line, a synthesized analog image signal;

converting means for converting the synthesized analog image signal generated by said selecting means into a synthesized digital image signal, and for generating, line-by-line, the synthesized digital image signal; and separating means for separating the synthesized digital image signal into first and second digital image signals representing the first and second faces of the original, respectively, and for generating, line-by-line, the first and second digital image signals.

8. An apparatus according to claim 7, wherein said first and second reading means alternatively generate the first and second analog image signals.

9. An apparatus according to claim 7, further comprising common processing means for processing the synthesized digital image signal from said converting means.

10. An apparatus according to claim 7, further comprising delay means for delaying one of the first and second digital image signals.

11. An apparatus according to claim 10, wherein said delay means executes a delay by a time corresponding to a deviation between the first and second positions.

12. An apparatus according to claim 7, wherein said first reading means reads the image of the original prior to the reading performed by said second reading means.

13. An apparatus according to claim 12, wherein said second reading means initiates reading of the image of the second face of the original before termination of reading of the image of the first face of the same original by said first reading means.

* * * * *

UNITED STATES PATENT AND TRADEMARK OFFICE
CERTIFICATE OF CORRECTION

PATENT NO. : 5,136,665
DATED : August 4, 1992
INVENTOR(S) : KEISHI INOUE

It is certified that error appears in the above-identified patent and that said Letters Patent is hereby corrected as shown below:

COLUMN 2

Line 39, "bits" should read --bit--.

COLUMN 3

Line 27, "photo" should read --photo- --.

COLUMN 4

Line 16, "distance(" should read --distance $\ell$--; and
Line 27, "distance(" should read --distance $\ell$--.

COLUMN 5

Line 15, "coincides" should read --which coincides--;
Line 41, "existing" should read --exists--; and
Line 43, "memory 31," should read --memory 31--.

UNITED STATES PATENT AND TRADEMARK OFFICE
CERTIFICATE OF CORRECTION

PATENT NO. : 5,136,665
DATED : August 4, 1992
INVENTOR(S) : KEISHI INOUE

It is certified that error appears in the above-identified patent and that said Letters Patent is hereby corrected as shown below:

COLUMN 6

Line 55, "a" should be deleted.

COLUMN 7

Line 19, "spond" should read --sponds--;
Line 41, "image" should read --digital image--.

Signed and Sealed this

Fourth Day of January, 1994

BRUCE LEHMAN

Attest:

Attesting Officer

Commissioner of Patents and Trademarks